United States Patent
Schauer et al.

(10) Patent No.: US 9,238,489 B2
(45) Date of Patent: Jan. 19, 2016

(54) DRIVER'S CAB SUSPENSION DEVICE WITH ROLL STABILIZING MEANS

(71) Applicant: ZF Friedrichshafen AG, Friedrichshafen (DE)

(72) Inventors: Michael Schauer, Osnabruck (DE); Jens Eismann, Melle (DE); Eike Helm, Diepholz (DE); Matthias Quaing, Emsburen (DE); Holger Bublies, Osnabruck (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 14/364,110

(22) PCT Filed: Dec. 18, 2012

(86) PCT No.: PCT/EP2012/075931
§ 371 (c)(1),
(2) Date: Jun. 10, 2014

(87) PCT Pub. No.: WO2013/107584
PCT Pub. Date: Jul. 25, 2013

(65) Prior Publication Data
US 2014/0319876 A1    Oct. 30, 2014

(30) Foreign Application Priority Data
Jan. 18, 2012    (DE) .......... 10 2012 200 670

(51) Int. Cl.
*B62D 33/08*    (2006.01)
*B62D 33/10*    (2006.01)
(Continued)

(52) U.S. Cl.
CPC .......... *B62D 33/0608* (2013.01); *B60G 99/002* (2013.01); *B60G 99/004* (2013.01); *B60G 99/008* (2013.01)

(58) Field of Classification Search
CPC .................................................. B62D 33/0608
USPC ......... 296/190.04, 190.05, 190.07; 180/89.13
See application file for complete search history.

(56) References Cited

U.S. PATENT DOCUMENTS

| 4,275,918 A | 6/1981 | Franco |
| 4,483,409 A * | 11/1984 | Fun ............................ 180/89.15 |

(Continued)

FOREIGN PATENT DOCUMENTS

| BE | 1018970 A3 | 12/2011 |
| DE | 29 31 405 A1 | 2/1980 |

(Continued)

OTHER PUBLICATIONS

German Search Report Corresponding to 10 2012 200 670.2 mailed Oct. 4, 2012.

(Continued)

*Primary Examiner* — Dennis H Pedder
(74) *Attorney, Agent, or Firm* — Davis & Bujold, P.L.L.C.; Michael J. Bujold (57) ABSTRACT

A suspension system for the resilient/damped suspension of a driver's cab of a motor vehicle relative to the vehicle chassis. The suspension system has a spring/damper arrangement and a hydraulic arrangement with hydraulic cylinders on the right and left sides, relative to the driving direction. The hydraulic cylinders are connected in a cross-over manner to form a roll stabilizing device. The suspension system has an upper cross-bridge that is arranged on the driver's cab and a lower cross-bridge that is arranged on the vehicle chassis. The spring/damper arrangement and the hydraulic arrangement are positioned between and connected to the upper and lower cross-bridges.

16 Claims, 4 Drawing Sheets

(51) Int. Cl.
  *B62D 33/06* (2006.01)
  *B60G 99/00* (2010.01)

(56) References Cited

U.S. PATENT DOCUMENTS

| | | | | |
|---|---|---|---|---|
| 5,109,939 | A | * | 5/1992 | Conaway et al. .......... 180/89.15 |
| 5,553,911 | A | | 9/1996 | Bodin et al. |
| 6,340,201 | B1 | * | 1/2002 | Higuchi ................... 296/190.07 |
| 6,758,294 | B2 | * | 7/2004 | Peddycord et al. ........ 180/89.12 |
| 7,216,925 | B1 | * | 5/2007 | Abele et al. ............... 296/190.07 |
| 7,350,612 | B2 | * | 4/2008 | Karlsson ................... 180/89.13 |
| 7,695,054 | B2 | | 4/2010 | Haeusler et al. |
| 7,950,726 | B2 | * | 5/2011 | Brown ..................... 296/190.07 |
| 8,434,581 | B2 | | 5/2013 | Buhl et al. |
| 8,820,456 | B2 | * | 9/2014 | Virtanen et al. ........... 180/89.12 |

FOREIGN PATENT DOCUMENTS

| | | |
|---|---|---|
| DE | 195 47 009 A1 | 6/1996 |
| DE | 198 53 876 A1 | 5/2000 |
| DE | 10 2007 052 038 A1 | 5/2009 |
| DE | 10 2008 063 812 A1 | 6/2010 |
| EP | 1 764 242 A1 | 9/2006 |
| WO | 2004/060702 A1 | 7/2004 |

OTHER PUBLICATIONS

International Search Report Corresponding to PCT/EP2012/075931 mailed Apr. 9, 2013.
Written Opinion Corresponding to PCT/EP2012/075931 mailed Apr. 9, 2013.

* cited by examiner

DRIVER'S CAB SUSPENSION DEVICE WITH ROLL STABILIZING MEANS

This application is a National Stage completion of PCT/EP2012/075931 filed Dec. 18, 2012, which claims priority from German patent application serial no. 10 2012 200 670.2 filed Jan. 18, 2012.

FIELD OF THE INVENTION

The invention concerns a suspension device for the resilient and shock-damping suspension of a driver's cab of a motor vehicle relative to a vehicle chassis.

BACKGROUND OF THE INVENTION

Suspension systems of the above type are used, for example but by no means exclusively, in trucks, agricultural vehicles or heavy-good vehicles. Since in such vehicles the spring and damper characteristics of the spring/damper units of the chassis have to be chosen to be comparatively large because of the considerable vehicle weights and because of the large unsprung masses in the chassis, road surface irregularities or even vibrations from the axles and the drive-train are first to a considerable extent transmitted to the chassis via the axle suspension. For that reason it is necessary, by means of a suitable suspension system, to decouple the driver's cab again, separately, from the vehicle chassis.

With elastic suspension devices of this type for driver's cabs, in order to dampen or restrict undesired rolling of the cab relative to the vehicle chassis, for example when driving along an incline or around a bend, or in the case when a road is uneven on one side only, suspension systems for driver's cabs usually comprise a device for roll stabilization. This ensures that jouncing movements of the cab relative to the chassis take place essentially in a linear manner, i.e. that the degree of freedom of movement between the cab and the chassis is reduced to a mainly vertical jouncing movement.

From DE 10 2007 052 038 A1 a system for the hydraulic stabilization of a driver's cab is known, in which the cylinder chambers of the oscillation dampers on the right and left sides of the cab suspension are connected to one another in a cross-over manner in order, in this way, to favor the jouncing of the cab suspension on the right and left sides in the same direction and suppress jouncing in opposite directions, in other words to achieve roll stabilization for the driver's cab.

However, the design of this known suspension system is comparatively complex and also entails fitting space problems, in particular since it is located in the forward area of the driver's cab where comparatively little fitting space is available for accommodating the components and assemblies of the suspension system. Furthermore, the known suspension system has a comparatively large number of individual components and assemblies, which tends to entail high manufacturing and assembly costs. Moreover, adaptation of the known suspension system to different types of vehicles and hence different spring, damping and rolling characteristics, is a comparatively complex process.

SUMMARY OF THE INVENTION

Against that background the purpose of the present invention is to provide a suspension system with which the limitations associated with the prior art can be overcome. In particular the design of the suspension system should be simple and easy to fit on the motor vehicle, and should require the smallest possible number of components. Furthermore, the suspension system should be adaptable for different purposes and types of vehicles with the least possible effort and expenditure.

That objective is achieved with a suspension system having the characteristics described below.

The suspension system serves for the resilient and shock-damping suspension of a driver's cab of a motor vehicle relative to the vehicle's chassis, in particular in a truck. For that purpose the suspension system comprises a spring/damper arrangement and a hydraulic arrangement with hydraulic cylinders on the right and left sides relative to the driving direction. The dual-action hydraulic cylinders each have cylinder chambers on the upper and the lower sides of their respective pistons, and the cylinder chambers on the upper and lower sides of the pistons on the right and left sides are connected with one another in a cross-over manner, whereby a hydraulic roll stabilizing system is formed. Thus, in each case a cylinder chamber on the upper side of the piston of one hydraulic cylinder is connected to a cylinder chamber on the lower side of the piston of the other hydraulic cylinder, and vice-versa.

According to the invention, the suspension system is developed further to the effect that in the rear suspension area of the driver's cab an upper cross-bridge, and on the vehicle chassis a lower cross-bridge associated with the upper cross-bridge are provided. The spring/damper arrangement and the hydraulic arrangement are positioned between the two cross-bridges, to which they are connected.

In other words this means, firstly, that the device for hydraulic roll stabilization is no longer arranged on the driver's cab at the front, but in the rear area of the driver's cab where there is greater flexibility with regard to the fitting space available and with regard to the arrangement of the components and assemblies of the suspension system. Furthermore, according to the invention upper and lower cross-bridges are provided in the rear area of the driver's cab, between which the spring/damper arrangement, and the hydraulic arrangement and hence also the roll stabilizing device, are located.

By virtue of the arrangement of the roll stabilizing system between the upper and lower cross-bridges and at the rear area of the driver's cab, all the components and assemblies of the roll stabilizing system can preferably be brought together directly in the area of the upper and lower cross-bridges and positioned between them. In this way not only is the rigidity of the suspension and roll stabilizing system increased (by virtue of the cross-bridges) in the rear area of the driver's cab, but also the arrangement of the components, in particular the hydraulic assemblies and the hydraulic lines between the hydraulic cylinders of the suspension system on the left and right sides, is better protected.

This also solves the fitting space problems that exist in the prior art in the front area of the driver's cab, and at the same time brings cost advantages due to the possible functional integration of the components and assemblies of the suspension system in the rear area of the driver's cab. Moreover, in particular because of the arrangement preferably of all the components and assemblies on and between the upper and lower cross-bridges, the suspension system can be designed as a relatively easily exchangeable module which, in turn, can have standardized interfaces for connection to the driver's cab and the chassis. This allows the suspension system to be adapted to the most varied vehicle groups or categories without any major modification complexity.

The invention can be implemented regardless of the type of spring/damper arrangement used in the suspension system. For example, the spring/damper arrangement can comprise steel springs. According to a preferred embodiment of the invention, however, the spring/damper arrangement consists of pneumatic spring elements on the left and right sides relative to the vehicle. In that case the hydraulic cylinders of the roll stabilizing device are preferably accommodated inside the pneumatic spring elements.

Pneumatic springs are advantageous in relation to low weight and because their characteristics can be varied simply by changing the air pressure. Moreover, the hydraulic cylinders of the roll stabilizing device can be arranged within the pneumatic spring elements, whereby considerable fitting space is saved, the number of assemblies is reduced and there is a mass reduction in relation to the suspension system as a whole.

In a further preferred embodiment of the invention the spring/damper arrangement comprises a single spring device, preferably a single pneumatic spring element, positioned between the cross-bridges and centrally in relation to the transverse direction of the vehicle. The suspension system then needs only a single spring device, in particular a pneumatic spring, for the rear area of the cab mounting. In this case, moreover, due to the cross-bridges there are no limitations regarding the spring properties or the rigidity of the rear cab mounting. Thus, this embodiment enables a further reduction of the number of individual components and assemblies, and hence corresponding mass and cost reductions.

Further, particularly preferred embodiments of the invention provide that the fluidic cross-connection between the hydraulic cylinders comprises at least one throttle device and/or at least one pressure reservoir device. By virtue of a throttle device—particularly in combination with a pressure reservoir—the hydraulic cylinders and their cross-over fluidic connection can also perform damping functions for the roll stabilizing device and for the suspension of the driver's cab. This mans that additional shock-absorbing or vibration dampers, at least in the rear area of the cab suspension, can if necessary be omitted since their function can be taken over by the hydraulic cylinders of the roll stabilizing device.

In a further preferred embodiment of the invention the fluidic connection between the hydraulic cylinders comprises components for the active regulation of the damping, such as controllable throttle elements, controllable pressure reservoirs and/or pumps for changing the pressure in the pressure reservoir or reservoirs. In this way the behavior and characteristics of the roll stabilizing device can be actively varied within wide limits, if necessary even in real time during the driving operation of the motor vehicle, as a function of drive-dynamical characteristics such as speeds and accelerations.

Thanks to the (possibly controllable) pressure reservoirs and/or throttle elements the roll stabilizing or suspension system is also very flexible and can be used in a variable manner as necessary. This means that the suspension system can be used in various driver's cab variations without having to modify or change the size of the hydraulic elements in any fundamental way. Rather, in such a case all that is needed, is to adapt the system pressure or the pressure reservoir type, in order to adapt the suspension system for a different driver's cab variant.

Other preferred embodiments of the invention provide that an essentially horizontally acting transverse damping device or a Panhard rod is arranged between the upper and lower cross-bridges for horizontal stabilization. With the horizontally acting transverse damping device or with the Panhard rod, the degree of freedom of the driver's cab along the transverse direction of the vehicle can be fixed or controlled in a defined manner. Particularly when a Panhard rod is used, this gives a simply designed and robust means for stabilization in the transverse direction of the vehicle.

BRIEF DESCRIPTION OF THE DRAWINGS

Below, the invention is explained in more detail with reference to drawings which illustrate embodiments of the invention presented only as examples. These show.

DETAILED DESCRIPTION OF THE PREFERRED EMBODIMENTS

Figures 1, 2:
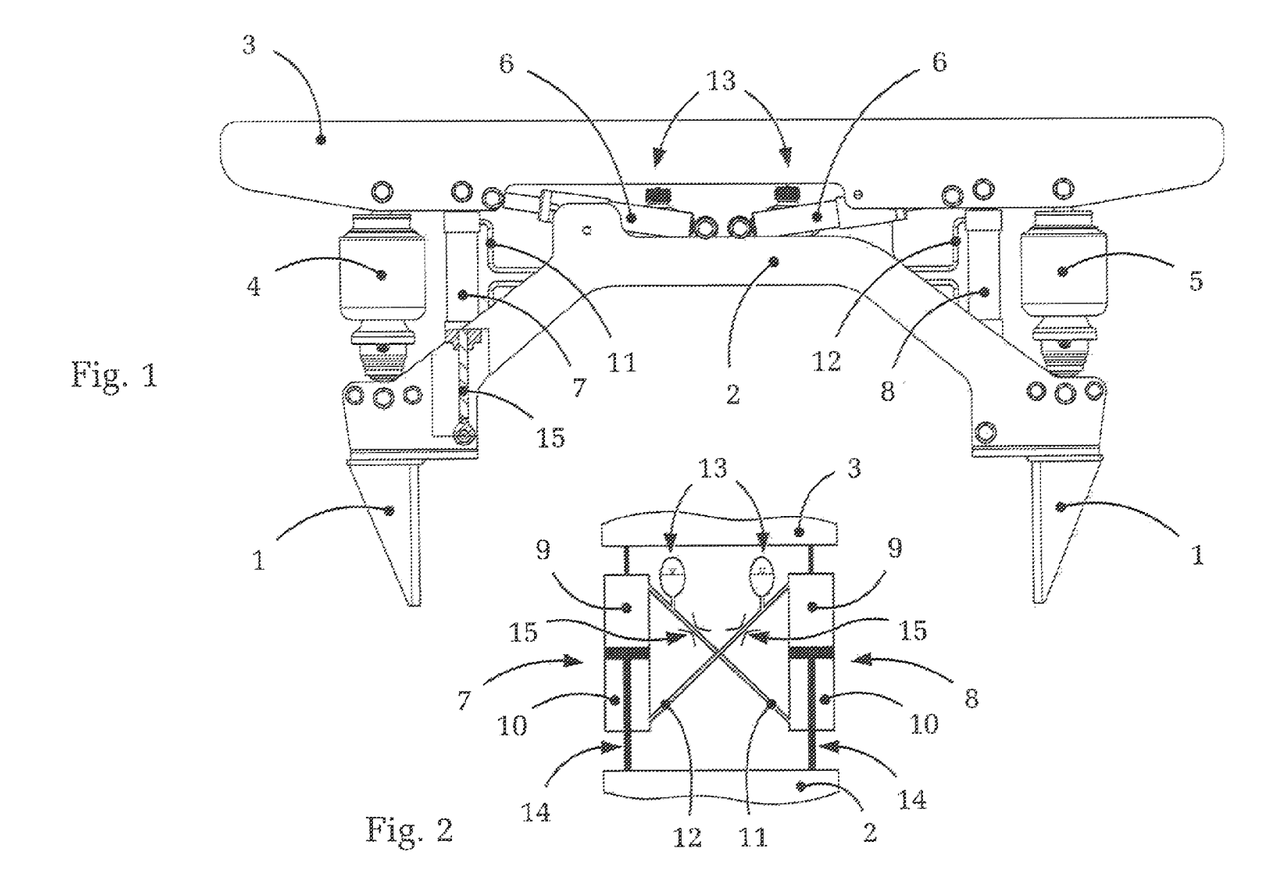
FIG. 1: An embodiment of a suspension system according to the present invention, with hydraulic roll stabilization.
FIG. 2: A schematic representation of the hydraulic roll stabilization of the suspension system shown in FIG. 1.

FIG. 1 shows an embodiment of a suspension system according to the present invention, for fitting between a truck chassis 1 and a driver's cab of the truck, looking along the driving direction from behind toward the rear of the driver's cab (not shown).

The figure shows the chassis 1 (only partially represented) of the truck on which, first, a lower cross-bridge 2 is fitted. In the rear area of the driver's cab is arranged a corresponding upper cross-bridge 3, which is connected to the driver's cab.

Between the upper cross-bridge 3 and the lower cross-bridge 2 are arranged the components or functional assemblies of the suspension system, which constitute a modular structure of the suspension system as a whole. Thus, the suspension system can be preassembled as a complete module and only then has to be connected to the chassis 1 and to the driver's cab, by means of corresponding standardized interfaces. In this way variants can be produced and the compatibility of the suspension system with the most varied requirement profiles and vehicle types is made considerably easier.

The suspension system comprises, first, two pneumatic spring/damper devices 4 and 5, which are respectively arranged on the outside between the upper cross-bridge 3 and the lower cross-bridge 2 and which are articulated to the cross-bridges 2, 3. The pneumatic spring/damper devices serve for the resilient and damped suspension of the driver's cab (with the upper cross-bridge 3) relative to the chassis 1. To damp oscillations between the driver's cab and the chassis 1 in the transverse direction of the vehicle, the suspension system represented in FIG. 1 also comprises two transverse dampers 6, which are also connected at their respective ends to the lower and upper cross-bridges 2, 3.

In addition, between the lower and upper cross-bridges 2, 3 is connected a hydraulic stabilizing device which comprises two hydraulic cylinders 7, 8. Each of the hydraulic cylinders 7, 8 has a cylinder chamber 9 above its piston and a cylinder chamber or annular chamber 10 below its piston (see FIG. 2). The cylinder chambers 9 and the annular chambers 10 are fluidically connected to one another in a cross-over manner by means of pressure lines 11, 12.

FIG. 2 in particular also shows that each of the two pressure lines 11, 12 is connected to a respective pressure reservoir 13. The pressure reservoirs 13 are necessary in order to, during jouncing of the two cylinders 7, 8 in the same direction, compensate for displacement volume differences between the cylinder chamber 9 and the annular chamber 10 caused by the cross-section of the piston rod 14 in each case.

Furthermore, the pressure reservoirs 13 also allow limited roll movements between the driver's cab (or rather the upper cross-bridge 3) and the chassis 1 (or rather lower cross-bridge 2). Such roll movements occur due to jouncing of the two hydraulic cylinders 7, 8 in opposite directions. Without the pressure reservoirs 13 any rolling movement would be firmly inhibited due to the fluidic cross-over connection between the hydraulic cylinders 7, 8. Thus, the pressure reservoirs 13 and their layout correspond to the torsional rigidity of a mechanical roll stabilizer (in the form of a torsion bar).

However, the pressure reservoirs 13 do not necessarily have to be arranged on the hydraulic lines 11, 12. Instead, they can also be connected directly to the hydraulic cylinders 7, 8.

To compensate for the different displacement volumes between the cylinder chamber 9 and the annular chamber 10, at least one pressure reservoir 13 per hydraulic circuit or pressure line 11, 12 is necessary. However, two or more pressure reservoirs 13 per hydraulic circuit or pressure line 11, 12 can also be provided, in order to be able to produce special roll characteristics that may be required. Furthermore, by changing the system pressure in a controlled manner by varying the gas pressure pre-stressing of the pressure reservoirs, it is possible to produce different roll characteristics or roll rigidities without having to replace any components for that purpose.

A further advantageous effect of the pressure reservoirs 13 is that the pressure changes occurring in the respective pressure reservoirs 13 during roll movements result in a progressive performance characteristic of the roll stabilizing device. Overall, the pressure reservoirs 13 result in greater flexibility in relation to the simple matching of the suspension system or roll stabilizing device to the purpose required in each case.

In the example embodiment shown (see FIG. 2), in the pressure lines 11, 12 connected in cross-over fashion there is also provided in each case a throttle 15. The throttles 15 restrict the fluid flow in the pressure lines 11, 12 so that a corresponding damping action mainly in relation to roll movements between the upper and lower cross-bridges 3 and 2 is produced.

Furthermore, however, the throttles 15 can also be used for damping linear jouncing movements of the driver's cab relative to the chassis 1 and also for damping pitching movements of the driver's cab. Since precisely during such linear jouncing movements a greater fluid flow takes place in the pressure lines 11, 12, the throttles 15 can in effect dampen such linear jouncing movements. In particular this can be used to allow the omission of any additional shock-absorbers (which, in the example embodiment according to FIG. 1, are arranged inside the pneumatic spring elements 4, 5).

Figure 4:
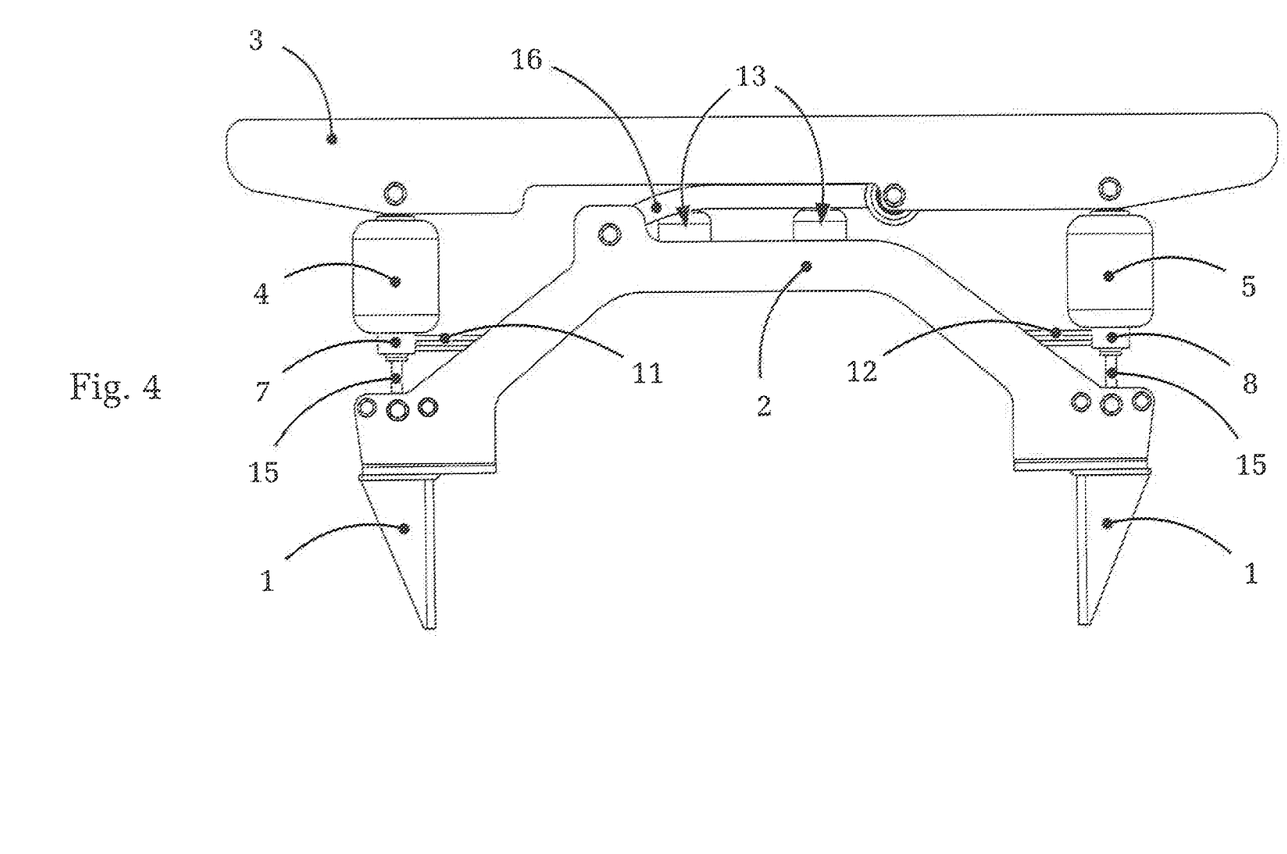
FIG. 4: An embodiment of a suspension system according to the present invention, with integrated spring/damper elements.

In other words, in this way the function of damping oscillations can be integrated in the roll stabilizing device. This functional integration is advantageous since the previously required shock-absorbers can be omitted. An example of a suspension system of that type is shown in FIG. 4. Compared with FIG. 1 it can be seen in FIG. 4 that the design of the roll stabilizing device is very compact, with the hydraulic cylinders 7, 8 integrated within the pneumatic spring elements 4, 5 so that the shock absorbers previously contained in the pneumatic spring elements 4, 5 are at the same time omitted.

Figure 3:
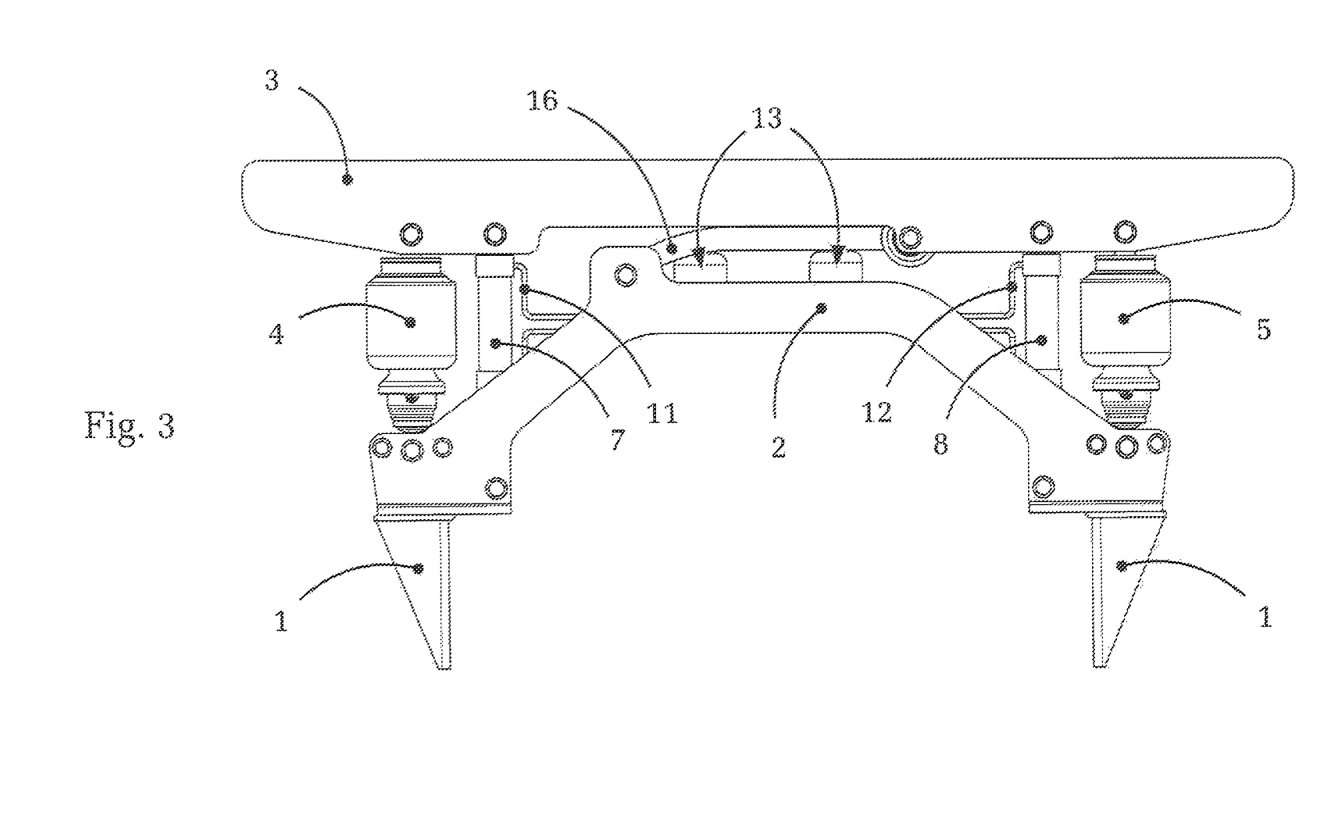
FIG. 3: An embodiment of a suspension system according to the present invention, with a Panhard rod.

FIG. 3 shows a further embodiment of a suspension system in which, in contrast to the embodiment in FIG. 1, a Panhard rod 16 carries out the horizontal stabilization between the upper cross-bridge 3 and the lower cross-bridge 2. This allows the transverse dampers 6 still needed in the embodiment according to FIG. 1, to be omitted. In this case the Panhard rod 16 can perform not only a stabilizing function but also shock-absorbing and oscillation damping functions if suitable shock-absorbing and/or oscillation-damping elastomer mountings are chosen for connecting the Panhard rod 16 to the lower and upper cross-bridges 2, 3.

In relation to horizontal stabilization by means of a Panhard rod 16 the embodiment in FIG. 4 corresponds to that shown in FIG. 3. Compared with the embodiments in FIGS. 1 and 3, in the embodiment shown in FIG. 4 the hydraulic cylinders 7, 8 of the roll stabilizing device have been relocated to the inside space of the pneumatic springs 4, 5. At the same time, in the embodiment of FIG. 4 there are no separate shock-absorbers or oscillation dampers, as are still present in the embodiments of FIGS. 1 and 3 although arranged inside the pneumatic springs 4, 5.

In the embodiment according to FIG. 4, the task performed by the vertical shock-absorbers and oscillation dampers, which are still present in the embodiments of FIGS. 1 and 3, is also taken over by the hydraulic cylinders 7, 8, but in this case these are at the same time each combined in a single assembly, respectively, with one of the pneumatic springs 4, 5. This gives a still more simplified overall structure for the suspension system, with fewer components, lower weight and correspondingly reduced costs.

Figure 5:
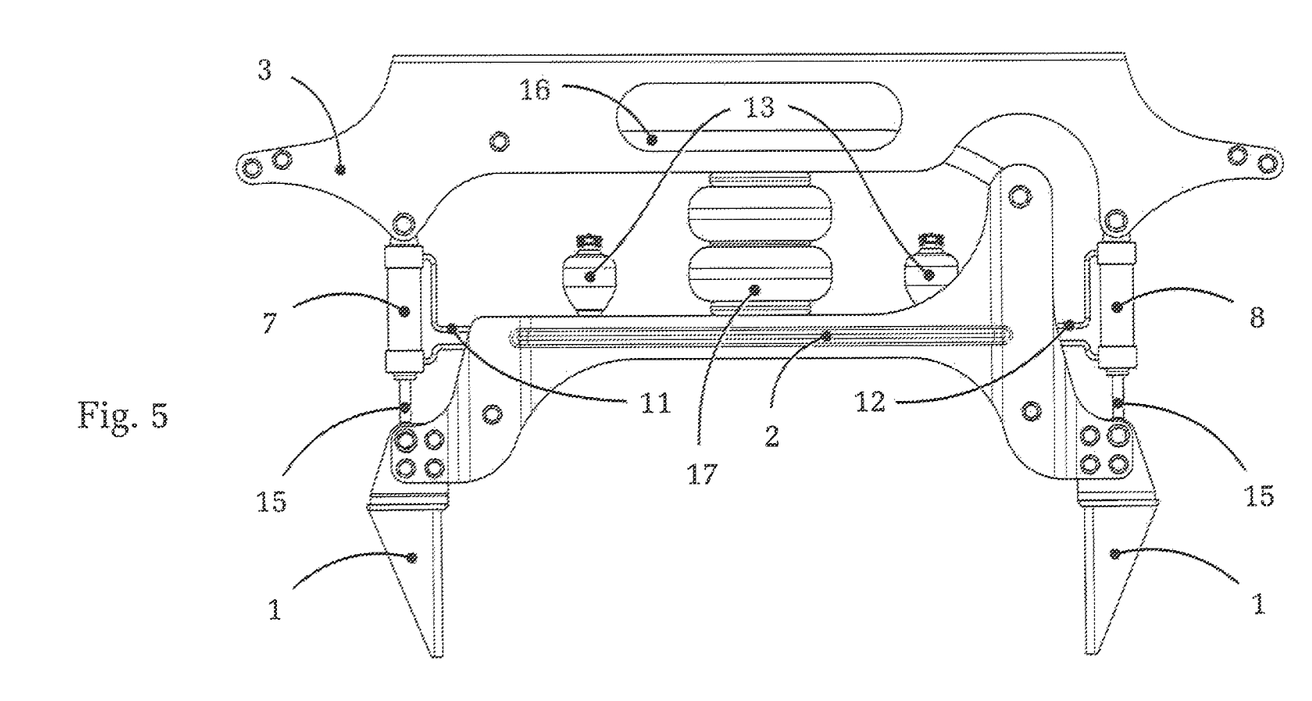
FIG. 5: An embodiment of a suspension system according to the present invention, with a central pneumatic spring.

Finally, FIG. 5 shows a further embodiment of a suspension system. The embodiment according to FIG. 5 differs from that shown in FIG. 4, in that instead of the two pneumatic springs 4, 5, only one, central pneumatic spring 17 of correspondingly larger size is provided, which performs the function of shock absorbing between the driver's cab or upper cross-bridge 3 and the chassis 1 or lower cross-bridge 2. In the embodiment shown in FIG. 5 as well, the functions of roll stabilization and oscillation damping (as in the embodiment of FIG. 4) are again performed by the hydraulic cylinders 7, 8 (in combination with the pressure lines 11, 12, the pressure reservoirs 13 and if necessary the throttles 15).

To influence lateral forces, the hydraulic cylinders 7, 8 can if necessary also be arranged obliquely (relative to the figure plane of FIG. 5). In that case (similarly to the embodiment of FIG. 1 but without the additional horizontal dampers 6) it is for example possible, with appropriate active control means for the hydraulic stabilizing system, to implement a speed-dependent characteristic in relation both to the roll rigidity and to the lateral force support.

It is therefore particularly evident that the suspension system according to FIG. 5 requires an absolute minimum of components and assemblies, most of which are in any case multi-functional. In this way a suspension system that can be used and fitted as a module which also incorporates roll stabilization means is obtained, which requires only relatively few components and assemblies, occupies minimal fitting space, and can be adapted easily to different requirements or vehicle types.

INDEXES

1 Chassis
2 Lower cross-bridge
3 Upper cross-bridge
4, 5 Spring/damper arrangement, pneumatic spring element
6 Transverse damper
7, 8 Hydraulic cylinder
9 Cylinder chamber
Cylinder chamber, annular chamber
11, 12 Pressure line
13 Pressure reservoir 14 Piston rod
15 Throttle
16 Panhard rod
17 Pneumatic spring element

The invention claimed is:

1. A suspension system for resilient and damping suspension of a cab of a motor vehicle relative to a vehicle chassis (1), the suspension system comprising:
a spring/damper arrangement (4, 5),
a hydraulic arrangement with first and second hydraulic cylinders (7, 8) being positioned on right and left sides of the suspension system, respectively, relative to a driving direction, and each of the first and the second hydraulic cylinders having a pair of upper and lower cylinder chambers (9, 10) on an upper side and on a lower side, respectively, of a piston of each of the first and the second hydraulic cylinders;
the upper cylinder chamber (9) of the first hydraulic cylinder (7) on the left side, above the piston, being fluidically connected in a cross-over manner to the lower cylinder chamber (10) of the second hydraulic (8) on the right side below the piston, and
the lower cylinder chamber (10) of the first hydraulic cylinders (7) on the left side, below the piston, being connected in a cross-over manner to the upper cylinder chamber (9) of second hydraulic cylinder (8) on the right side, above the piston, to form a hydraulic roll stabilizing device;
an upper cross-bridge (3) being arranged in a rear suspension area of the cab;
a lower cross-bridge (2), associated with the upper cross-bridge (3), being arranged on the chassis (1);
a horizontal stabilization arrangement having at least one component (6, 16 connecting the lower cross-bride (2) to the upper cross-bridge (3);
each of the horizontal stabilization arrangement, the spring/damper arrangement (4, 5) and the hydraulic arrangement being located vertically between the upper and the lower cross-bridges (2, 3);
the spring/damper arrangement (4, 5) and the hydraulic arrangement both being connected to both the upper and the lower cross-bridges (2, 3); and
each of the first and the second hydraulic cylinders being aligned at least substantially normal to a horizontal axis defined by the upper cross-bridge to enhance roll stabilization.

2. The suspension system according to claim 1, wherein
the spring/damper arrangement (4, 5) is formed by left and right pneumatic spring elements (4, 5) positioned on the left side and the right side, relative to the driving direction, and
all components of the first and second hydraulic cylinders (7, 8) are completely arranged laterally between the left and the right pneumatic spring elements (4, 5) relative to the driving direction.

3. The suspension system according to claim 1, wherein
the spring/damper arrangement (4, 5) comprises only one spring device (17) which is centrally arranged, in a transverse direction of the vehicle, between the upper and the lower cross-bridges,
the spring device and the first and the second hydraulic cylinders are vertically aligned normal to a horizontal defined by the lower cross-bridge; and
the upper cross-bridge (3) has a longer axial length than an axial length of the lower cross-bridge (2).

4. The suspension system according to claim 3, wherein the spring device is in the form of a pneumatic spring;
a first end of the horizontal stabilization arrangement is connected to the upper cross-bridge (3) adjacent one of the left and the right side of the suspension system;
the horizontal stabilization arrangement extends toward the other of the right and the left side of the suspension system; and
a second end of the horizontal stabilization arrangement is connected to the lower cross-bridge (2) adjacent the other of the right and the left side of the suspension system.

5. The suspension system according to claim 1, wherein the fluidic connection (11, 12) between first and second hydraulic cylinders (7, 8) comprises first and second pressure lines,
the first pressure line connects an upper side of the first hydraulic cylinder to a lower side of the second hydraulic cylinder and the second pressure line connects an upper side of the second hydraulic cylinder to a lower side of the first hydraulic cylinder, and
each of the first and the second pressure lines comprises:
at least one throttle device (15), and
at least two pressure reservoir devices (13).

6. The suspension system according to claim 1, wherein the fluidic connection (11, 12), between the first and second hydraulic cylinders (7, 8), comprises at least one of controllable throttle elements, controllable pressure reservoirs and pumps for active regulation of the damping.

7. The suspension system according to claim 1, wherein the at least one component of the horizontal stabilization arrangement (6, 16) is one of a pair of transverse damping devices (6), that act essentially horizontally, such that the pair of transverse damping devices (6) are arranged between the upper and the lower cross-bridges (3, 2), and
an entirety of the pair of transverse damping devices are arranged, relative to the driving direction, between the first and the second hydraulic cylinders (7, 8) such that the first and second hydraulic cylinders (7, 8) are arranged on the left and right sides of the pair of transverse damping devices (6), respectively.

8. The suspension system according to claim 1, wherein the at least one component of the horizontal stabilization arrangement (6, 16) is a Panhard rod (16), and the Panhard rod (16) is arranged between the upper and the lower cross-bridges (3, 2) for horizontal stabilization of the cab.

9. A suspension system for resilient and damping suspension of a cab of a motor vehicle relative to a vehicle chassis, the suspension system comprising:
a spring/damper arrangement;
a hydraulic arrangement having:
a right side hydraulic cylinder positioned on a right side of the suspension system relative to a driving direction of the motor vehicle;
a left side hydraulic cylinder positioned on a left side of the suspension system relative to the driving direction of the motor vehicle; and
each of the right side and the left side hydraulic cylinders comprising a piston located therein for separating upper and lower cylinder chambers from one another;
a hydraulic roll stabilizing device having:
a first pressure line by which the upper cylinder chamber of the right side hydraulic cylinder is in fluid communication, via the first pressure line, with the lower cylinder chamber of the left side hydraulic cylinder; and
a second pressure line by which the upper cylinder chamber of the left side hydraulic cylinder is in fluid communication, via all the second pressure line, with the lower cylinder chamber of the right side hydraulic cylinder so that fluid can flow between the upper chamber of one hydraulic cylinder and the lower chamber of the other hydraulic cylinder;

an upper cross-bridge being connected to and supporting the cab in a rear suspension area thereof and a lower cross-bridge being connected to the chassis;

a horizontal stabilization arrangement having:
  at least one component connecting the lower cross-bridge to the upper cross-bridge,
  a first end of the horizontal stabilization arrangement being connected to the upper cross-bridge adjacent one of the left and the right side of the suspension system,
  the horizontal stabilization arrangement extending toward the other of the right and the left side of the suspension system, and
  a second end of the horizontal stabilization arrangement being, connected to the lower cross-bridge adjacent the other of the right and the left side of the suspension system;

one end of the spring/damper arrangement being connected to the upper cross-bridge and an opposite end of the spring/damper arrangement being connected to the lower cross-bridge;

one end of each of the right side and the left side hydraulic cylinders being connected to the upper cross-bridge and an opposite end of the respective one end of each of the right side and the left side hydraulic cylinders being connected to the lower cross-bridge;

the spring/damper arrangement and the left and the right side hydraulic cylinders are arranged vertically relative to the driving direction of the vehicle; and the suspension system is reassembled as a complete module for connection to the rear of the vehicle chassis as a preassembled complete module.

10. The suspension system according to claim 9, wherein the spring/damper arrangement comprises right and left pneumatic spring elements that are respectively positioned on the right side and the left side, relative to the driving direction, and an entirety of each of the right side and the left side hydraulic cylinders are respectively arranged inside the right and the left pneumatic spring elements.

11. The suspension system according to claim 9, wherein the spring/damper arrangement comprises a single spring device which is centrally arranged in a transverse direction of the vehicle between the upper and the lower cross-bridges, each of the first and the second pressure lines comprises a pressure reservoir and a throttle, the pressure reservoirs are respectively connected to the first and the second pressure lines between the throttle and the upper chambers of the respective left and the right side hydraulic cylinders.

12. The suspension system according to claim 11, wherein the spring device is a pneumatic spring.

13. The suspension system according to claim 9, wherein the fluid communication between the right side and the left side hydraulic cylinders comprises fluid connections which comprise at least one of:
  at least one throttle device, and
  at least one pressure reservoir device.

14. The suspension system according to claim 9, wherein the fluid communication between the right side and the left side hydraulic cylinders comprise the first and the second pressure lines which comprise at least one of controllable throttle elements, controllable pressure reservoirs and pumps for actively regulating damping.

15. The suspension system according to claim 9, further comprising;
  a transverse damping device, which is at least one component of the horizontal stabilization arrangement;
  such that an upper end of the transverse damping device is connected to the upper cross-bridge and an opposite lower end of the transverse damping device is connected to the lower cross-bridge so that the transverse damping device acts essentially horizontally between the upper and the lower cross-bridges; and
  both of the upper and the lower ends of the transverse damping device are connected respectively to the upper and lower cross-bridges, relative to the driving direction, between the right and the left side hydraulic cylinders.

16. The suspension system according to claim 9, wherein the at least one component of the horizontal stabilization arrangement is a Panhard rod which is arranged between the upper and the lower cross-bridges for horizontal stabilization of the cab.

* * * * *